United States Patent
Baek et al.

(10) Patent No.: US 10,764,504 B2
(45) Date of Patent: Sep. 1, 2020

(54) METHOD FOR REDUCING PARALLAX OF MULTIPLE CAMERAS AND ELECTRONIC DEVICE SUPPORTING THE SAME

(71) Applicant: Samsung Electronics Co., Ltd., Gyeonggi-do (KR)

(72) Inventors: Jae Myung Baek, Gyeonggi-do (KR); Sang Kee Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/110,524

(22) Filed: Aug. 23, 2018

(65) Prior Publication Data

US 2019/0068886 A1 Feb. 28, 2019

(30) Foreign Application Priority Data

Aug. 23, 2017 (KR) .................. 10-2017-0106849

(51) Int. Cl.
*H04N 5/232* (2006.01)
*H04N 5/225* (2006.01)
*H04N 5/217* (2011.01)

(52) U.S. Cl.
CPC ......... *H04N 5/23296* (2013.01); *H04N 5/217* (2013.01); *H04N 5/2253* (2013.01); *H04N 5/2254* (2013.01); *H04N 5/2257* (2013.01); *H04N 5/2258* (2013.01);
(Continued)

(58) Field of Classification Search
CPC ............... H04N 5/2253; H04N 5/2258; H04N 5/23287; H04N 5/23296; H04N 5/23293; H04N 5/232935; G03B 2205/00–0038; G03B 2205/0053–0084; G02B 27/64–646
See application file for complete search history.

(56) References Cited

U.S. PATENT DOCUMENTS 9,030,578 B2   5/2015 Asakura
9,341,861 B2   5/2016 Kang
9,420,187 B2   8/2016 Neufeld et al.
(Continued)

FOREIGN PATENT DOCUMENTS

KR   1020170045552   4/2017

OTHER PUBLICATIONS

European Search Report dated Jan. 7, 2019 issued in counterpart application No. 18190288.3-1209, 8 pages.

*Primary Examiner* — Paul M Berardesca
(74) *Attorney, Agent, or Firm* — The Farrell Law Firm, P.C.

(57) ABSTRACT

An electronic device is provided that includes a display, and a first camera module including a first lens and a first lens driving unit. The electronic device also includes a second camera module including a second lens and a second lens driving unit. The electronic device further includes a processor configured to display a first image, which is obtained through the first camera module. The processor is also configured to receive an input associated with switching from the first camera module to the second camera module. Additionally, the processor is configured to move the second lens in a direction that reduces parallax with the first camera module by using the second lens driving unit. The processor is further configured to display a second image, which is obtained through the second camera module in the state in which the second lens is moved.

20 Claims, 9 Drawing Sheets

(52) U.S. Cl.
CPC ..... *H04N 5/23287* (2013.01); *H04N 5/23293* (2013.01); *H04N 5/232935* (2018.08)

(56) References Cited

U.S. PATENT DOCUMENTS

| | | |
|---|---|---|
| 9,584,731 B2 | 2/2017 | Neufeld et al. |
| 10,194,089 B2 | 1/2019 | Nash et al. |
| 2010/0097442 A1* | 4/2010 | Lablans ................ G03B 5/00 348/36 |
| 2010/0127157 A1* | 5/2010 | Tamaki ................ G03B 17/02 250/208.1 |
| 2013/0182150 A1 | 7/2013 | Asakura |
| 2015/0156422 A1 | 6/2015 | Neufeld et al. |
| 2015/0198781 A1 | 7/2015 | Kang |
| 2016/0330382 A1 | 11/2016 | Neufeld et al. |
| 2017/0078591 A1* | 3/2017 | Petrov ................ H04N 5/332 |
| 2017/0094183 A1 | 3/2017 | Miller et al. |
| 2017/0150126 A1 | 5/2017 | Kim |
| 2017/0230585 A1 | 8/2017 | Nash et al. |

\* cited by examiner

METHOD FOR REDUCING PARALLAX OF MULTIPLE CAMERAS AND ELECTRONIC DEVICE SUPPORTING THE SAME

CROSS-REFERENCE TO RELATED APPLICATION(S)

This application is based on and claims priority under 35 U.S.C. § 119(a) to Korean Patent Application No. 10-2017-0106849, filed in the Korean Intellectual Property Office on Aug. 23, 2017, the entire disclosure of which is incorporated herein by reference.

BACKGROUND

1. Field

The present disclosure relates generally to a technology of reducing parallax between multiple cameras, and more particularly to, a method and an electronic device for reducing parallax by preventing a change in a field of view (FOV) or a central position of the FOV between images.

2. Description of Related Art

An electronic device that includes a camera may provide a capturing function for a user. For example, the electronic device may obtain an image captured from the camera as a shutter operates and may display a preview image, which is obtained from the camera, on a display.

The electronic device may include a plurality of cameras such as, for example, dual cameras. For example, the electronic device may include a plurality of cameras having mutually different FOVs and spaced apart from each other by a predetermined distance. The cameras may capture images of the same subject with mutually different FOVs. The electronic device may produce, by using the captured images with mutually different FOVs, images having a characteristic, such as higher quality, a wider FOV, or a three-dimensional feature, which are all different from the characteristics of an image captured through a single camera.

In the case of an electronic device including a plurality of cameras, parallax may occur due to the distance between the cameras or the assembly deviation of the cameras (e.g., the relative angle of rotation between the cameras, or the deviation between the centers of the image sensors and the centers of the lens in the cameras). When parallax occurs, a rapid change is made, for example, in the FOV or the center of the FOV of a preview image shown to a user at the time point of switching between the cameras. Accordingly, the quality of the image may be degraded causing user dissatisfaction.

SUMMARY

The present disclosure has been made to address at least the above problems and/or disadvantages and to provide at least the advantages described below. Accordingly, an aspect of the present disclosure provides a method for reducing parallax between cameras to.

In accordance with an aspect of the present disclosure, an electronic device is provided that includes a display, and a first camera module including a first lens and a first lens driving unit, which drives the first lens. The electronic device also includes a second camera module disposed adjacent to the first camera module and including a second lens and a second lens driving unit, which drives the second lens. The electronic device further includes a processor configured to display a first image, which is obtained through the first camera module, through the display. The processor is also configured to receive an input associated with switching from the first camera module to the second camera module while the first image is being displayed through the display. Additionally, the processor is configured to move, based at least on the input, the second lens in a direction that reduces parallax with the first camera module by using the second lens driving unit. The processor is further configured to display, based at least on the input, a second image, which is obtained through the second camera module in the state in which the second lens is moved, through the display.

In accordance with another aspect of the present disclosure, an electronic device is provided that includes a display and a first camera module including a first lens and a first lens driving unit, which drives the first lens. The electronic device also includes a second camera module including a second lens and a second lens driving unit, which drives the second lens. The electronic device further includes a processor configured to receive an input associated with the first camera module or the second camera module, and move the second lens in a direction that reduces parallax with the first camera module by using the second lens driving unit, in response to the input. The processor is also configured to obtain an image through the second camera module in a state in which the second lens is moved, and display the image through the display.

In accordance with another aspect of the present disclosure, an electronic device is provided that includes a display, a first camera module including a first lens, and a second camera module disposed adjacent to the first camera module and including a second lens and a lens driving unit, which drives the second lens. The electronic device further includes a processor configured to display a first image, which is obtained through the first camera module, through the display, and receive an input associated with switching from the first camera module to the second camera module while the first image is being displayed through the display. The processor is also configured to move, based at least on the input, the second lens in a direction that reduces parallax with the first camera module by using the lens driving unit, and display, based at least on the input, a second image, which is obtained through the second camera module in a state in which the second lens is moved, through the display.

BRIEF DESCRIPTION OF THE DRAWINGS

The above and other aspects, features, and advantages of certain embodiments of the present disclosure will be more apparent from the following description when taken in conjunction with the accompanying drawings, in which.

DETAILED DESCRIPTION

Figure 1:
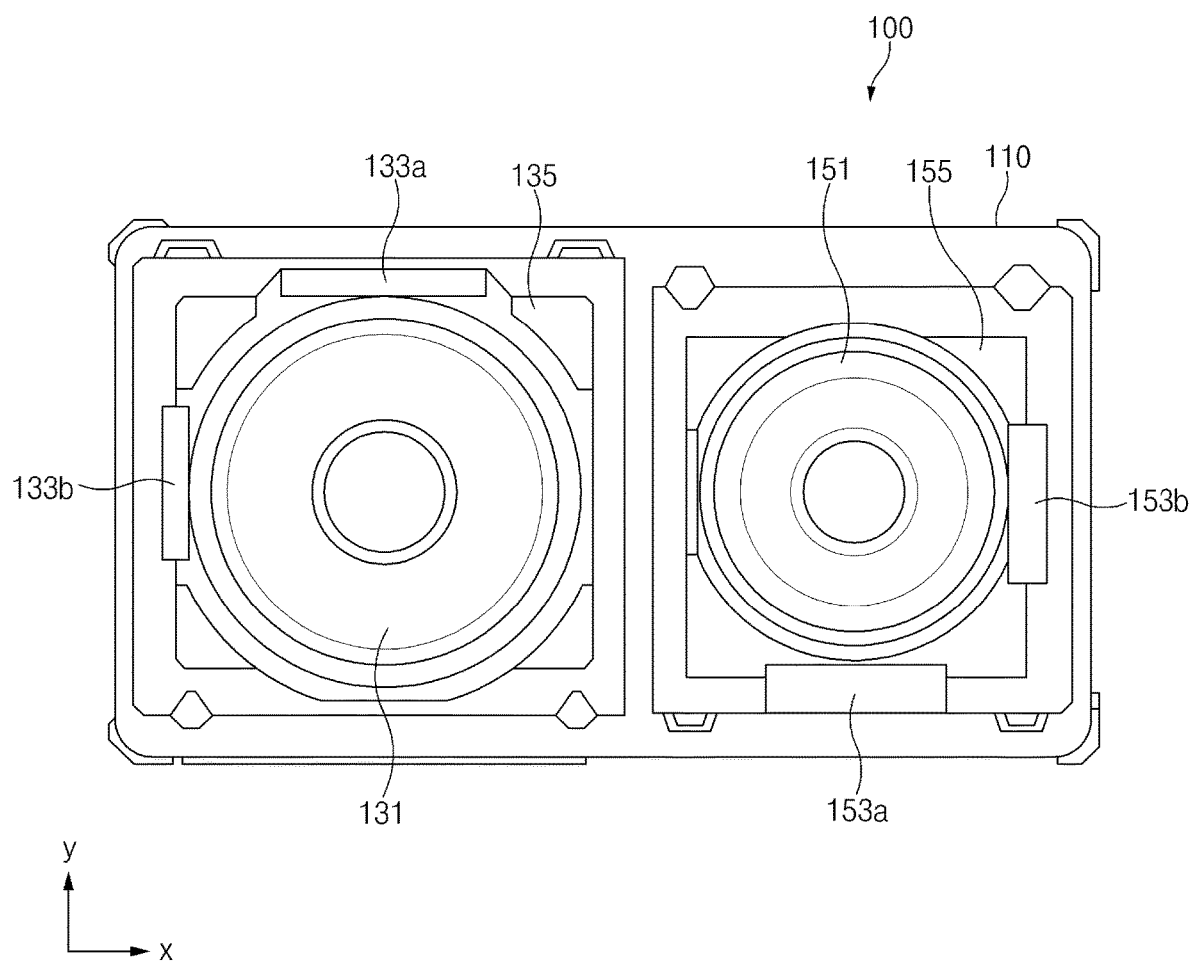
FIG. 1 is a diagram illustrating a camera assembly, according to an embodiment.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

FIG. 1 is a diagram illustrating a camera assembly, according to an embodiment.

Referring to FIG. 1, a camera assembly 100 may include a housing 110, a first camera module (or a first camera), and a second camera module (or a second camera). However, the configuration of the camera assembly 100 is not limited thereto. The camera assembly 100 may include at least one other component in addition to the above-described components. For example, the camera assembly 100 may further include a third camera module.

The housing 110 may receive the first camera module and the second camera module therein. According to an embodiment, the housing 110 may include a front surface, a rear surface, and a side surface surrounding at least a portion of a space defined between the front surface and the rear surface. The front surface of the housing 110 may include at least one opening, and the first camera module and the second camera module are inserted into the housing 110 through the opening and disposed in the space.

The first camera module includes a first lens unit 131, first lens driving units 133a and 133b, and a first image sensor 135. The first lens unit 131 may include a lens barrel unit positioned on the first image sensor 135. The first lens unit 131 and the first image sensor 135 may be received through the opening of the housing 110 such that optical axes of the first lens unit 131 and the first image sensor 135 are parallel to each other. The first lens unit 131 may include at least one first lens for image capturing. The at least one first lens may have a first focus length and a first FOV The first lens driving units 133a and 133b may have structures for driving the first lens unit 131. For example, the first lens driving units 133a and 133b may serve as an optical image stabilizer (OIS) driving unit to provide driving force for an anti-handshake function. According to an embodiment, the first lens driving units 133a and 133b may include at least two pairs of coils and magnetic substances. The two pairs of coils and magnetic substances may include a first actuator 133a, including a first coil and a first magnetic substance, and a second actuator 133b, including a second coil and a second magnetic substance. The first actuator 133a and the second actuator 133b may be arranged perpendicularly to each other. The coil and the magnetic substance constituting each actuator may be positioned to face each other. Specifically, the first coil and the first magnetic substance may be positioned to face each other. Similarly, the second coil and the second magnetic substance maybe positioned to face each other.

According to an embodiment, when power is applied to the first coil, the first lens unit 131 may move in a first direction (e.g., a Y-axis direction) by electromagnetic force formed between the first coil and the first magnetic substance. In addition, when power is applied to the second coil, the first lens unit 131 may move in a second direction (e.g., an X-axis direction) by electromagnetic force formed between the second coil and the second magnetic substance.

The first image sensor 135 is mounted on a printed circuit board (PCB) to be connected with an image processing device of an electronic device, such as, for example, a digital camera, a mobile communication terminal, or a tablet PC, in which the camera assembly 100 is mounted. The PCB may be provided as an integrated type having a plurality image sensors (e.g., the first image sensor 135 and a second image sensor 155), or may include a plurality of PCBs such that each of a plurality of image sensors (e.g., the first image sensor 135 and the second image sensor 155) is mounted on a respective PCB. According to an embodiment, the camera assembly 100 may further include a structure of moving at least one of the first image sensor 135 and the second image sensor 155 in the first direction (e.g., an X-axis direction) or the second direction (e.g., an Y-axis direction).

The second camera module includes a second lens unit 151, second lens driving units 153a and 153b, and the second image sensor 155. The second lens unit 151 may have a structure identical to or similar to that of the first lens unit 131 of the first camera module. For example, the second lens unit 151 may include a lens barrel unit positioned on the second image sensor 155. The second lens unit 151 and the second image sensor 155 may be received through the opening of the housing 110 such that optical axes of the second lens unit 151 and the second image sensor 155 are parallel to each other. According to an embodiment, the second lens unit 151 may include at least one second lens for image capturing. The at least one second lens may have a second focus length different from the first focus length of the first lens, and a second FOV different from the first FOV of the first lens. For example, the first lens may be a wide-angle lens having a wider FOV (i.e., the first FOV>the second FOV) and a shorter focus length (i.e., the first focus length<the second focus length), when compared with those of the second lens. Additionally, the second lens may be a telephoto lens having a narrower FOV and a longer focus length, when compared with those of the first lens.

The second lens driving units 153a and 153b may have structures for driving the second lens unit 151. For example, the second lens driving units 153a and 153b may serve as an OIS driving unit to provide driving force for an anti-handshake function. According to an embodiment, the second lens driving units 153a and 153b may include at least two pairs of coils and magnetic substances. The two pairs of coils and magnetic substances may include a third actuator 153a including a third coil and a third magnetic substance and a fourth actuator 153b including a fourth coil and a fourth magnetic substance. The third actuator 153a and the fourth actuator 153b may be arranged perpendicularly to each other. The coil and the magnetic substance constituting each actuator may be positioned to face each other. For example, the third coil and the third magnetic substance may be positioned to face each other. Similarly, the fourth coil and the fourth magnetic substance may be positioned to face each other.

According to an embodiment, when power is applied to the third coil, the second lens unit 151 may move in the first direction (e.g., the Y-axis direction) by an electromagnetic force formed between the third coil and the third magnetic substance. In addition, when power is applied to the fourth coil, the second lens unit 151 may move in the second direction (e.g., the X-axis direction) by an electromagnetic force formed between the fourth coil and the fourth magnetic sub stance.

Similar to the first image sensor 135, the second image sensor 155 may be mounted on a PCB or may be connected with an image processing device of an electronic device on which the camera assembly 100 is mounted.

According to an embodiment, the lens driving unit (e.g., the first lens driving units 133a and 133b, or the second lens driving units 153a and 153b) may include a driving circuit unit and a position sensor to detect the displacement and the position of the lens driving unit. For example, the driving circuit unit and the position sensor may be positioned at the center of each coil (e.g., the first coil, the second coil, the third coil, or the fourth coil). The position sensor may include a hall sensor or may be implemented by using an optical encoder or a mechanical encoder. The driving circuit unit may apply a driving signal for anti-handshake to each coil, based on status information on focus length adjustment and position information of the lens driving unit detected from the position sensor, which are provided through an additional path.

Figure 2:
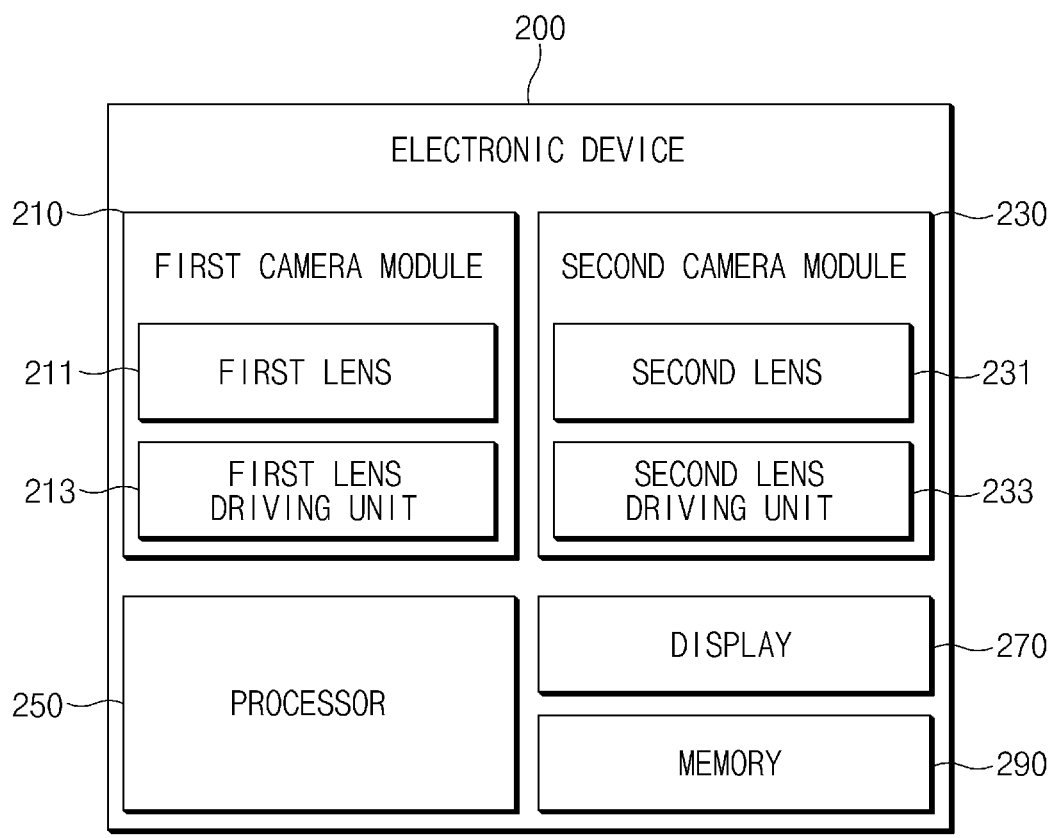
FIG. 2 is a block diagram of an electronic device including a plurality of cameras, according to an embodiment.

FIG. 2 is a block diagram illustrating an electronic device including a plurality of cameras, according to an embodiment.

Referring to FIG. 2, an electronic device 200 includes a first camera module 210, a second camera module 230, a processor 250, a display 270, and a memory 290. However, the configuration of the electronic device 200 is not limited thereto. The electronic device 200 may further include at least one other component in addition to the above-described components. For example, the electronic device 200 may further include an input device to receive an input from a user or a communication circuit to communicate with an external electronic device.

According to an embodiment, the first camera module 210 and the second camera module 230 are provided in the electronic device 200 while being included in a camera assembly 100.

The camera module (e.g., the first camera module 210 and the second camera module 230) may take a still image and a moving picture. According to an embodiment, the camera module may include an imaging device. The imaging device may include at least one of a lens (e.g., a first lens 211 and a second lens 231), which receives image light of a subject and forms an image, an aperture, which adjusts the amount of light passing through the lens, a shutter (or a shooting button), which opens and closes the aperture such that an image sensor is exposed to the light for a specific time, the image sensor, which receives, as an optical signal, the image formed through the lens, and an internal memory. The internal memory may temporarily store the taken image. The internal memory may store the image formed through the image sensor before the shutter is handled.

The camera module may have some moveable components. For example, the lenses 211 or 231 included in the camera module may be moved by a lens driving unit (e.g., a first lens driving unit 213 or a second lens driving unit 233). The first lens 211 may be moved in the first direction or the second direction by the first lens driving unit 213, and the second lens 231 may be moved in the first direction or the second direction by the second lens driving unit 233. According to an embodiment, the first lens driving unit 213 may include a first actuator 133a, which moves the first lens 211 in the first direction, and a second actuator 133b which moves the first lens 211 in the second direction. The second lens driving unit 233 may include a third actuator 153a, which moves the second lens 231 in the first direction, and a fourth actuator 153b which moves the second lens 231 in the second direction.

According to an embodiment, the first lens 211 and the second lens 231 may have mutually different focus lengths and mutually different FOVs. For example, the first lens 211 may be a wide-angle lens having a wider FOV and a shorter focus length, when compared with those of the second lens 231. Additionally, the second lens 231 may be a telephoto-lens having a narrower FOV and a longer focus length, when compared with those of the first lens 211.

The processor 250 may include one or more of a central processing unit (CPU), an application processor (AP), and a communication processor (CP). The processor 250 may perform, for example, data processing or an operation associated with control or communication of at least one component of the electronic device 200. The processor 250 may control, for example, a plurality of hardware and/or software components connected with the processor 250, and perform various data processing and arithmetic operations by running an operating system (OS) or an application program. The processor 250 may be, for example, implemented with a system on chip (SoC). According to an embodiment, the processor 250 may further include a graphic processing unit (GPU) and/or an image signal processor.

The processor 250 may be electrically connected with the first lens 211 and the second lens 231, the first lens driving unit 213 and the second lens driving unit 233, an aperture, an image sensor, and a shutter, which are included in the first camera module 210 and the second camera module 230 to control functions associated with the camera module. The processor 250 may control a function such as, for example, auto focus, auto exposure, custom white balance, zoom in, zoom out, shooting, continuous shooting, timer shooting, flash on/off, or filtering. In another example, the processor 250 may store the taken image in the internal memory or the memory 290 and may output the taken image to the display 270. For example, the processor 250 may provide the image stored in the internal memory in the form of a preview or a live-view. According to an embodiment, the processor 250 may store an image formed through the handling of the shutter in the internal memory and may store the taken image in the memory 290, when a specific user input is made or based on set information.

According to an embodiment, the processor 250 may output the image to the display 270 based on the determined zoom magnification. The processor 250 may determine whether to provide an image, based on any one or two (the first image and the second image) of the first image obtained through the first camera module 210 and the second image obtained through the second camera module 230. For example, the processor 250 may determine an image to be output to the display 270, based on the second image obtained through the second camera module 230 including the second lens 231 having a longer focus length, when the zoom magnification is determined as high magnification. The processor 250 may determine an image to be output to the display 270, based on the first image obtained through the first camera module 210 including the first lens 211 having a shorter focus length, when the zoom magnification is determined as low magnification. In another example, the processor 250 may determine the image to be output to the display 270, based on the first image and the second image in at least a portion of the procedure of changing the zoom magnification from the high magnification to a low magnification, or the procedure of changing the zoom magnification from the low magnification to the high magnification.

According to an embodiment, the processor 250 may change each image attribute (e.g., an image size) at least based on the determined zoom magnification. The processor 250 may control a power specification (e.g., on/off/sleep modes) of each camera module based on the determined zoom magnification.

According to an embodiment, the processor 250 may change the settings of at least one of the first camera module 210 and the second camera module 230 such that the attributes (e.g., color, brightness, focus) of the first camera module 210 and the second camera module 230 are identical to or similar to each other. For example, the processor 250 may change the attribute of one camera module (e.g., the second camera module 230) based on the attribute of another camera module (e.g., the first camera module 210). In another example, the processor 250 may change attributes of all camera modules such that the attributes are identical to or similar to each other.

According to an embodiment, the processor 250 may drive a lens driving unit corresponding to handshake information of a user. The processor 250 may prevent the shaking of an image (blurred image) produced from a camera module by changing the position of the lens using the lens driving unit. Additionally, the processor 250 may control components of each camera to reduce the difference in an FOV or the central position of the FOV between images (e.g., a first image obtained through the first camera module 210 and a second image obtained through the second camera module 230) which is to be made when the camera modules are switched to each other (e.g., when the first camera module 210 is switched to the second camera module 230, or when the second camera module 230 is switched to the first camera module 210). For example, the processor 250 may move the position of at least one of the first lens 211 and the second lens 231. In another example, the processor 250 may move the position of at least one of a first image sensor included in the first camera module 210 and a second image sensor included in the second camera module 230. In a further example, the processor 250 may move the central position of the crop region of at least one of the first image sensor of the first camera module 210 and the second image sensor of the second camera module 230 and may extract (or select) a portion of an image obtained from the at least one image sensor.

According to an embodiment, the processor 250 may select one or more pixels, which correspond to a direction of reducing the parallax between the cameras, among a plurality of pixels included in the first image sensor and may obtain the first image by using the selected one or more pixels. Specifically, the processor 250 may obtain the first image by performing a readout with respect to only a partial region (a region corresponding to the selected one or more pixels) of the first image sensor. Similarly, the processor 250 may select one or more pixels, which correspond to a direction of reducing the parallax between the cameras, among a plurality of pixels included in the second image sensor, and may obtain the second image by using the selected one or more pixels. Specifically, the processor 250 may obtain the second image by performing a readout with respect to only a partial region (a region corresponding to the selected one or more pixels) of the second image sensor.

According to an embodiment, the processor 250 may set the central point of the crop region (e.g., the region corresponding to the selected one or more pixels) to be the central point of any one of a plurality of specified regions of the center region, an upper region, a lower region, a left region, a right region, an upper left region, a lower left region, an upper right region, and a lower right region of the first image sensor or the second image sensor, and may store the setting information associated with the central point in the memory 290.

According to an embodiment, the processor 250 may select, as the first image (or the second image), at least a partial region, which corresponds to the direction of reducing the parallax between cameras, of an image obtained through a camera module. For example, the processor 250 may read out information (or a signal value) of whole pixels included in the image sensor of the camera module and may produce a raw image based on the read-out information (or the signal value). The raw image may include, for example, a layer and data (e.g., YUV value) of each pixel. The processor 250 may select at least a partial region of the raw image to correspond to the direction of reducing the parallax between the cameras and may create the first image (or the second image) having an image format, such as JPEG, by using the selected region. For example, the processor 250 may read out information (or a signal value) of whole pixels included in the image sensor of the camera module and may produce raw image based on at least a portion of the read-out information (or the signal value). The at least a portion of the read-out information may be information on the region selected to correspond to the direction of reducing the parallax between cameras. The processor 250 may create the first image (or the second image) in a form, such as a JPEG, of an image by using a raw image corresponding to the selected region.

According to an embodiment, the processor 250 may correct the parallax between the first camera module 210 and the second camera module 230 by using a lens driving unit (e.g., the first lens driving unit 213 or the second lens driving unit 233). Additionally, the processor 250 may move the central point of a crop region of at least one of the first image sensor of the first camera module 210 and the second image sensor of the second camera module 230 in the direction of reducing the parallax between the first camera module 210 and the second camera module 230, and may extract (or select) a portion of an image obtained from the at least one image sensor. In another example, the processor 250 may correct the parallax between the first camera module 210 and the second camera module 230 using any one of the above-described methods or using a combination of the above-described methods. Specifically, after correcting the parallax between the first camera module 210 and the second camera module 230 by using the lens driving unit, the processor 250 may move the central point of a crop region of at least one of the first image sensor of the first camera module 210 and the second image sensor of the second camera module 230 in the direction of reducing the parallax between the first camera module 210 and the second camera module 230, and may extract (or select) a portion of an image obtained from the at least one image sensor, thereby complementing the correction of the parallax between the cameras.

The display 270 may display various types of content (e.g., a text, an image, a video, an icon, a symbol, or the like) for a user. According to an embodiment, the display 270 may output an image captured through the camera module. For example, the display 270 may output an image stored in the internal image included in the camera module, or may output an image stored in the memory 290 of the electronic device 200. The display 270 may include a touch screen and may receive, for example, a touch input, a gesture input, a proximity input, or a hovering input by using an electronic pen or a part of the body of a user.

The memory 290 may store an instruction or data related to at least one of the remaining components of the electronic device 200. According to an embodiment, the memory 290 may store software and/or a program. For example, the memory 290 may store an application (e.g., a camera application) for supporting image capturing through the first camera module 210 or the second camera module 230. In another example, the memory 290 may store an image captured through the first camera module 210 or the second camera module 230. For example, the memory 290 may include a volatile and/or nonvolatile memory.

According to an embodiment, the memory 290 may store information used for correcting the parallax between the camera modules caused by the assembly deviation between the first camera module 210 and the second camera module 230. The processor 250 may correct the parallax between the first camera module 210 and the second camera module 230 by using the information stored in the memory 290 when the first camera module 210 or the second camera module 230 operates. Specifically, the processor 250 may operate the first camera module 210 or the second camera module 230 in a state in which the parallax between the first camera module 210 and the second camera module 230 caused by the assembly deviation is corrected.

According to an embodiment, the parallax between camera modules caused by the assembly deviation of the first camera module 210 and the second camera module 230 may be measured during a camera calibration in the manufacturing process of a camera assembly 100, and information (e.g., a calibration value) used to correct the parallax may be stored in the memory 290. The electronic device 200 may correct the parallax based on the driving characteristic of each camera module using a calibration value stored in the memory 290, since the driving characteristic of the lens driving unit is varied in every camera module.

According to an embodiment, the parallax between the camera modules caused by the assembly deviation of the first camera module 210 and the second camera module 230 may be corrected during the manufacturing process of the camera assembly 100. For example, the parallax between the camera modules caused by the assembly deviation may be corrected by using the calibration value measured through the camera calibration process, after the camera calibration process. The camera calibration process may be re-performed after the parallax between the camera modules is corrected.

According to an embodiment, the processor 250 may control the first lens driving unit 213 and the second lens driving unit 233 to operate as an OIS driving unit for the anti-handshake, in a state in which the parallax between the first camera module 210 and the second camera module 230 has been corrected. For example, the processor 250 may correct the parallax between the first camera module 210 and the second camera module 230 by using at least one of the first lens driving unit 213 and the second lens driving unit 233 and may set the driving states of the first lens driving unit 213 and the second lens driving unit 233 to initial states for OIS driving. Specifically, in a state in which the parallax between the first camera module 210 and the second camera module 230 has been corrected, the processor 250 may set the central point (or the reference point) or an initial position for the operation of the OIS by using the first lens driving unit 213 and the second lens driving unit 233.

As described above, according to an embodiment, an electronic device may include a display, a first camera module including a first lens and a first lens driving unit, which drives the first lens, a second camera module including a second lens and a second lens driving unit, which drives the second lens, and disposed adjacent to the first camera module, and a processor. The processor may be configured to display a first image, which is obtained through the first camera module, through the display, to receive an input associated with switching from the first camera module to the second camera module while the first image is being displayed through the display. The processor is also configured to move, based at least on the input, the second lens in a direction that reduces parallax with the first camera module by using the second lens driving unit, and to display, based at least on the input, a second image, which is obtained through the second camera module in a state in which the second lens is moved, through the display.

The processor may be further configured to move, based at least on the input, the first lens in a direction that reduces parallax with the second camera module by using the first lens driving unit.

The processor may be further configured to receive, as at least a portion of the input, a zoom input indicating a specified magnification or an input initiating a function for switching between the first camera module and the second camera module.

The first lens may have a first FOV and a first focus length, and the second lens may have a second FOV, which is narrower than the first FOV, and a second focus length, which is longer than the first focus length.

The direction may be a first direction that positions a direction of a central axis of the second FOV to be parallel with a direction of a central axis of the first FOV or a second direction that positions the direction of the central axis of the second FOV to aim at a specific subject positioned in the direction of the central axis of the first FOV.

The processor may be further configured to select one or more pixels, which correspond to the direction that reduces the parallax with the first camera module, among a plurality of pixels included in an image sensor of the second camera module, and to obtain the second image by using the selected one or more pixels.

The processor may be further configured to select one or more pixels, which correspond to the direction that reduces parallax with the second camera module, among a plurality of pixels included in an image sensor of the first camera module, and to obtain the first image by using the selected one or more pixels.

The processor may be further configured to select, as the second image, at least a portion of an image, which corresponds to the direction that reduces the parallax with the first camera module, the image being obtained through the second camera module.

The processor may be configured to select, as the first image, at least a portion of an image, which corresponds to the direction that reduces parallax with the second camera module, the image being obtained through the first camera module.

The electronic device may further include a sensor. The processor may be configured to determine a degree of movement for the first lens or a degree of movement for the second lens, based on a temperature measured through the sensor or a variation of the temperature.

As described above, according to an embodiment, an electronic device may include a display, a first camera module including a first lens and a first lens driving unit, which drives the first lens, a second camera module including a second lens and a second lens driving unit, which drives the second lens, and disposed adjacent to the first camera module, and a processor. The processor may be configured to receive an input associated with the first camera module or the second camera module, to move the second lens in a direction that reduces parallax with the first camera module by using the second lens driving unit, in response to the input, to obtain an image through the second camera module in a state in which the second lens is moved, and to display the image through the display.

The processor may be further configured to move the first lens in a direction that reduces parallax with the second camera module by using the first lens driving unit, in response to the input, The processor may be further configured to receive, as at least a portion of the input, an input for operating at least one of the first camera module and the second camera module or an input for initiating a function for switching between the first camera module and the second camera module.

The processor may be further configured to select one or more pixels, which correspond to the direction that reduces the parallax with the first camera module, among a plurality of pixels included in an image sensor of the second camera module, and to obtain the image by using the selected one or more pixels.

As described above, according to an embodiment, an electronic device may include a display, a first camera module including a first lens and a first lens driving unit, which drives the first lens, a second camera module including a second lens and a second lens driving unit, which drives the second lens, and disposed adjacent to the first camera module, and a processor. The processor may be configured to display a first image, which is obtained through the first camera module, through the display, to receive an input associated with switching from the first camera module to the second camera module while the first image is being displayed through the display, to move, based at least on the input, the second lens in a direction that reduces parallax with the first camera module by using the lens driving unit, and to display, based at least on the input, a second image, which is obtained through the second camera module in a state in which the second lens is moved, through the display.

The processor may be further configured to select one or more pixels, which correspond to the direction of reducing the parallax with the first camera module, among a plurality of pixels included in an image sensor of the second camera module, and to obtain the second image by using the selected one or more pixels.

The processor may be further configured to select one or more pixels, which correspond to the direction that reduces the parallax with the second camera module, among a plurality of pixels included in an image sensor of the first camera module, and to obtain the first image by using the selected one or more pixels.

The processor may be further configured to select, as the second image, at least a portion of an image, which corresponds to the direction that reduces the parallax with the first camera module, the image being obtained through the second camera module.

The processor may be further configured to select, as the first image, at least a portion of an image, which corresponds to the direction that reduces the parallax with the second camera module, the image being obtained through the first camera module.

The electronic device may further include a sensor. The processor may be configured to determine a degree of movement for the second lens, based on a temperature measured through the sensor or a variation of the temperature.

Figure 3:
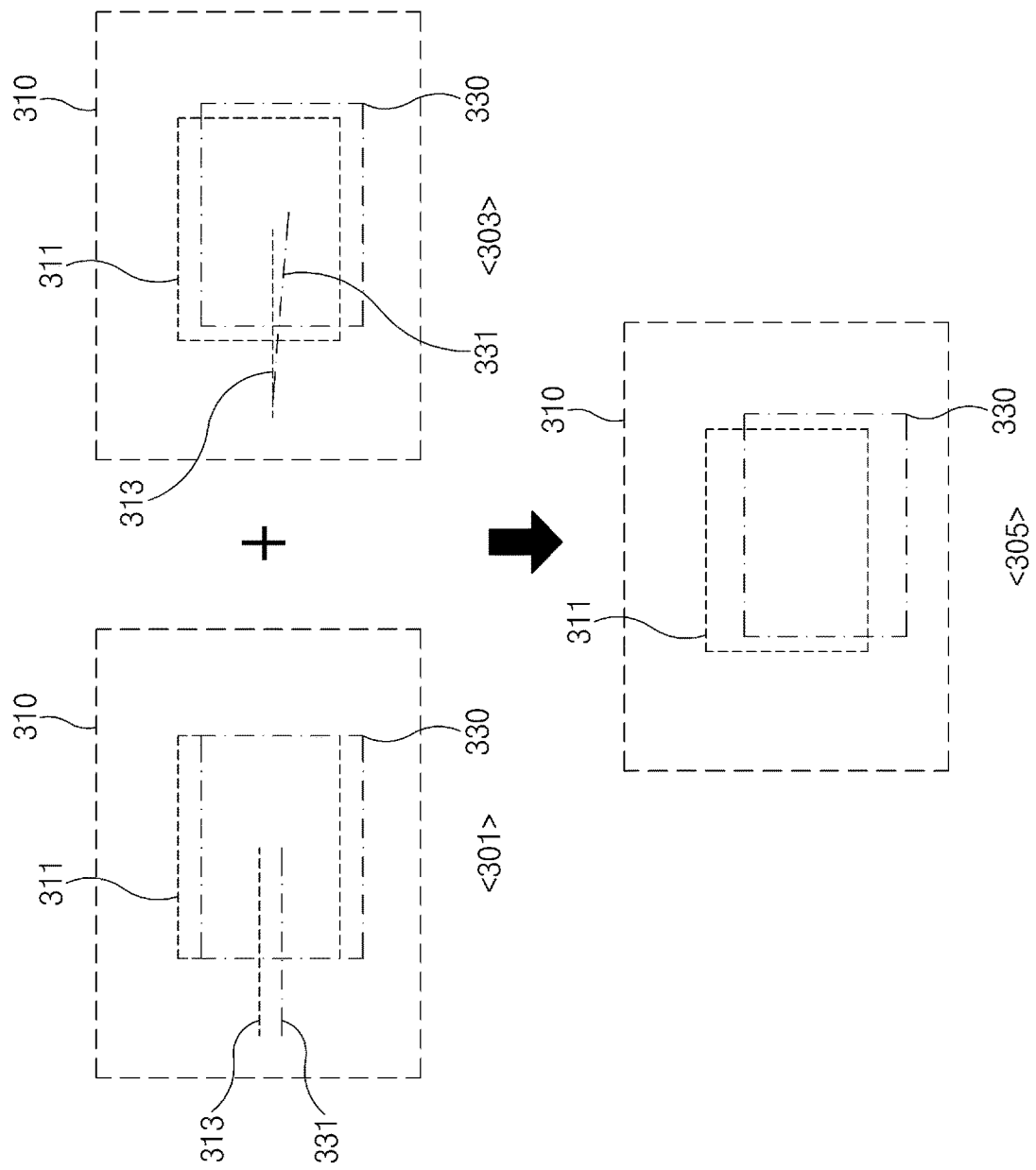
FIG. 3 is a diagram illustrating parallax between a plurality of cameras, according to an embodiment.

FIG. 3 is a diagram illustrating parallax between a plurality of cameras, according to an embodiment.

Referring to FIG. 3, parallax between a plurality of camera modules (e.g., the first camera module 210 and the second camera module 230 of FIG. 2) may occur due to the distance between the cameras and the assembly deviation (e.g., the relative angle of rotation between the cameras, or the deviation between the center of the image sensor and the center of the lens in cameras) of the cameras. In FIG. 3, a first state 301 indicates that the parallax occurs due to the distance between the cameras, a second state 303 indicates that the parallax occurs due to the assembly deviation between the cameras, and a third state 305 indicates that the parallax occurs due to the distance between the cameras and the assembly deviation between the cameras.

A first region 310 is a capture region of a first camera determined by a first focus length and a first FOV, and a second region 330 is a capture region of a second camera determined by a second focus length and a second FOV.

According to an embodiment, when a preview is provided by using the first camera having a shorter first focus length (the first focus length<the second focus length) and a wider first FOV (the first FOV>the second FOV), an electronic device may select a partial region 311 of the first region 310 based on a screen region of a display and may output first capture image corresponding to the selected region 311 on the display. In contrast, when a preview is provided by using the second camera having a longer second focus length and a narrower second FOV, the electronic device may output a second capture image corresponding to the second region 330, which is based on the screen region of the display, on the display.

According to an embodiment, when zoom magnification is changed while the preview is being provided by using the first camera, the camera providing the preview may be switched from the first camera to the second camera. The electronic device may display the second capture image on the display instead of the first capture image. The reverse of the above description is also true. When zoom magnification is changed while the preview is being provided by using the second camera, the camera providing the preview may be switched from the second camera to the first camera. The electronic device may display the first capture image on the display instead of the second capture image.

The electronic device may reduce the parallax occurring due to the distance between the first camera and the second camera, that is, the distance between a first base line 313 of the first camera and a second base line 331 of the second camera. Additionally, the electronic device may reduce the parallax occurring due to the assembly deviation between the first camera and the second camera. As a result, the electronic device may reduce both parallax occurring due to the distance between the cameras and parallax occurring due to the assembly deviation of the cameras. The method for reducing the parallax is described in greater detail below.

Figure 4A:
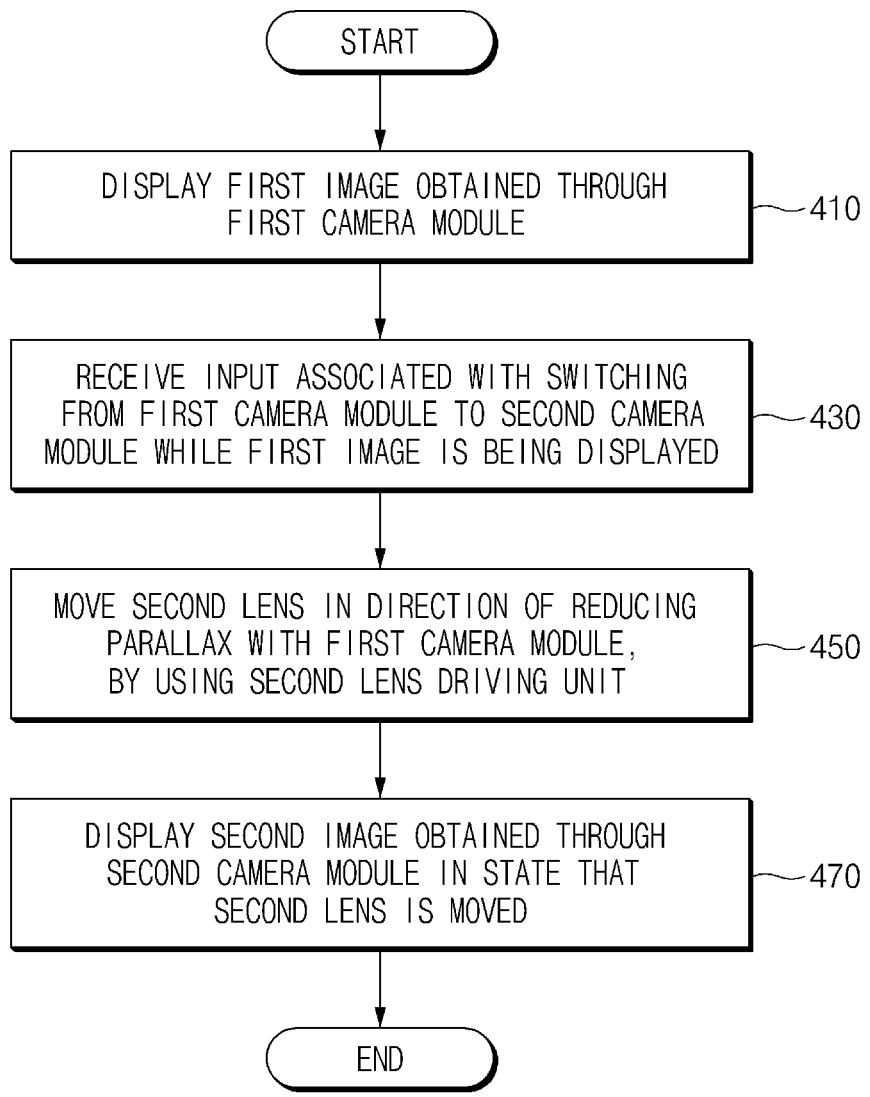
FIG. 4A is a flowchart illustrating a method for reducing parallax between a plurality of cameras, according to an embodiment.

FIG. 4A is a flowchart illustrating a method for reducing parallax between a plurality of cameras, according to an embodiment.

Referring to FIG. 4A, a processor of an electronic device displays a first image, which is obtained through a first camera module, on a display, in operation 410. According to an embodiment, the processor may provide the first image, which is obtained through the first camera module, in the form of a preview.

In operation 430, the processor receives an input associated with a camera switching operation. The camera switching operation may include the switching operation between the first camera module and the second camera module, based on, for example, the change in the zoom magnification. For example, when the zoom magnification is changed from a low magnification to a high magnification, the processor may switch from the first camera module including a wide-angle lens to the second camera module including a telephoto lens. In another example, when the zoom magnification is changed from a high magnification to a low magnification, the processor may switch from the second camera module including the telephoto lens to the first camera module including the wide-angle lens.

According to an embodiment, the processor may receive an input associated with the camera switching operation, when an object for changing zoom magnification, which is displayed on the screen of the display, or a button for changing the zoom magnification, which is exposed to the outside of the housing, is selected.

In operation 450, the processor corrects the parallax between cameras by moving a lens of the second camera module. For example, the processor may move the position of the lens of the second camera module in a direction that reduces the parallax between the cameras, by driving a lens driving unit of the second camera module.

According to an embodiment, the processor may move an image sensor of the second camera module instead of moving the lens of the second camera module. Alternatively, the processor may move the lens of the second camera module while moving the image sensor of the second camera module. The range for the correction of the parallax may be widened. In another example, the processor may move the central point of the crop region of the second image sensor in the second camera module and may select (or extract) a portion of the second image.

In operation 470, the processor displays a second image, which is obtained through the second camera module, on the display. For example, the processor may provide the second image in the form of a preview.

The above-described operations may represent processing operations made when the camera switching operation occurs in a state in which a preview image is provided. According to an embodiment, the processor may perform operations of correcting the parallax between the cameras in advance even before the preview image is provided. The processor may move a lens of the first camera module instead of moving the lens of the second camera module. Alternatively, the processor may move the lens of the first camera module while moving the lens of the second camera module. The processor may move an image sensor of the first camera module instead of moving an image sensor of the second camera module. Alternatively, the processor may move the image sensor of the first camera module while moving the image sensor of the second camera module.

Figure 4B:
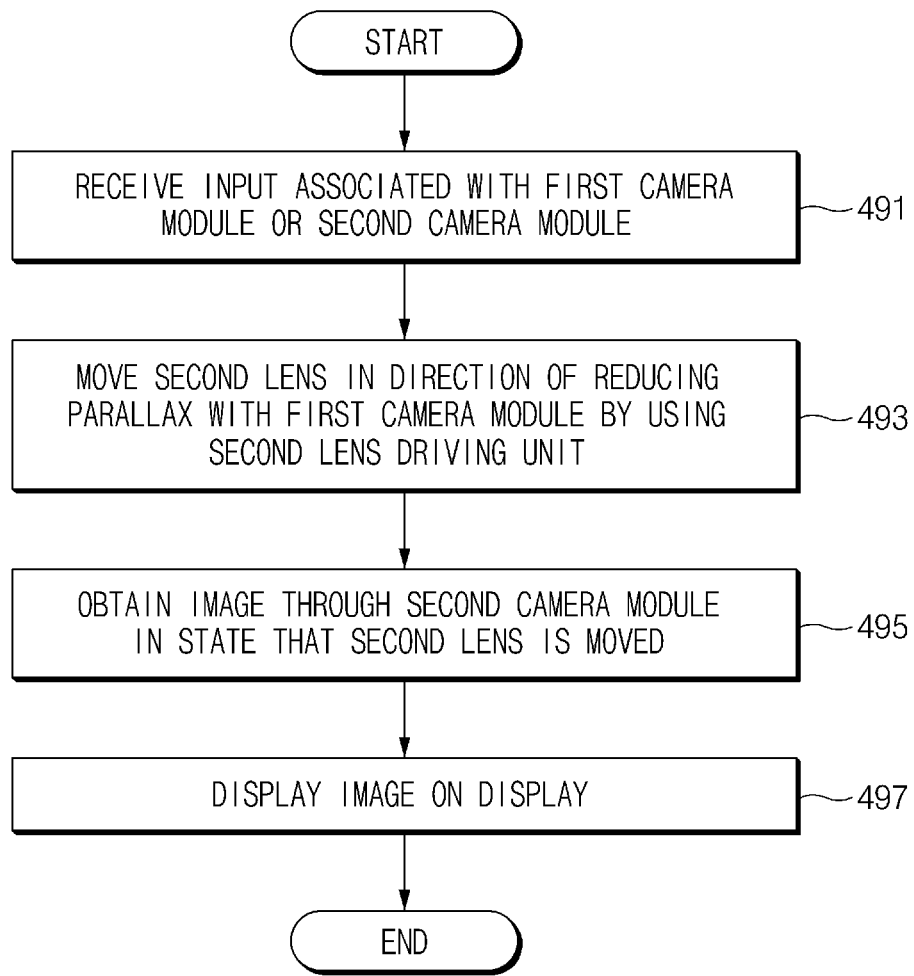
FIG. 4B is a flowchart illustrating a method for reducing parallax between a plurality of cameras, according to another embodiment.

FIG. 4B is a flowchart illustrating a method for reducing parallax between a plurality of cameras, according to another embodiment.

Referring to FIG. 4B, a processor of an electronic device may reduce the parallax between the camera modules, which occurs due to the assembly deviation of the first camera module and the second camera module. For example, a memory of the electronic device may store information (e.g., a calibration value) for correcting the parallax between the cameral modules, which occurs due to the assembly deviation measured during camera calibration in the manufacturing process of a camera assembly. The processor may reduce the parallax between the first camera module and the second camera module, by using the information for correcting the parallax, which is stored in the memory, when the first camera module or the second camera module operates. Specifically, the processor may operate the first camera module or the second camera module in a state in which the parallax between the first camera module and the second camera module, which is caused by the assembly deviation is reduced.

In operation 491, the processor receives an input associated with the first camera module or the second camera module. The input may include, for example, an input to operate the first camera module or the second camera module.

In operation 493, the processor moves a second lens of the second camera module in a direction that reduces the parallax with the first camera module by using a second lens driving unit of the second camera module. For example, the processor may move the second lens such that the direction of the central axis of the FOV of the second camera module is parallel to the direction of the central axis of the FOV of the first camera module. The processor may move the second lens such that the direction of the central axis of the FOV of the second camera module aims at a specific subject positioned in the direction of the central axis of the FOV of the first camera module.

In operation 495, the processor obtains an image through the second camera module when the second lens is moved. For example, the processor may obtain an image captured through the second camera module, in a state in which the parallax between the first camera module and the second camera module is corrected.

In operation 497, the processor displays the obtained image on a display. The processor may provide the image, which is obtained through the second camera module, in the form of a preview.

Figure 5:
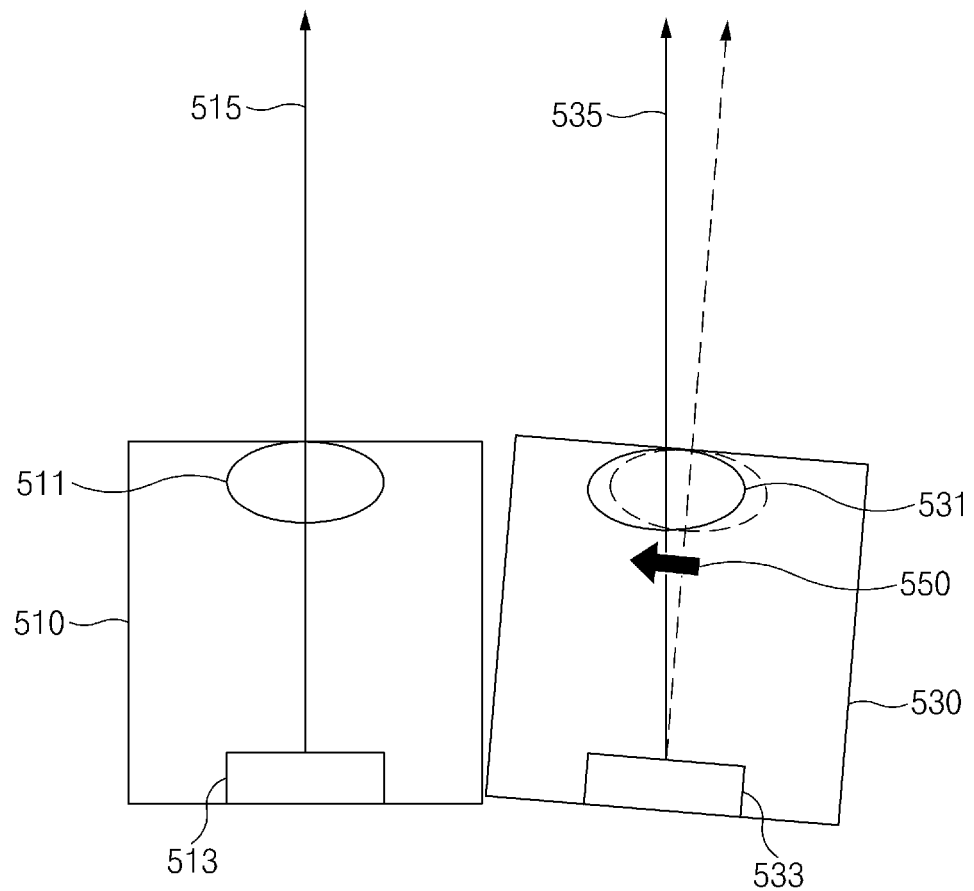
FIG. 5 is a diagram illustrating a method for reducing the parallax between a plurality of cameras by moving a lens, according to an embodiment.

FIG. 5 is a diagram illustrating a method for reducing the parallax between a plurality of cameras by moving a lens, according to an embodiment.

Referring to FIG. 5, an electronic device may move a lens of any one camera or a plurality of cameras to reduce the parallax between cameras. For example, the electronic device may move a lens of a camera by driving a lens driving unit (e.g., an OIS driving unit) of the camera.

According to an embodiment, the electronic device may move at least one of a lens 511 of a first camera 510 and a lens 531 of a second camera 530 when parallax exists between the first camera 510 and the second camera 530, that is, when a direction 515 (e.g., the direction of a line linking the center of an image sensor 513 of the first camera 510 and the center of the lens 511) toward the center of an FOV of the first camera 510 and a direction 535 (e.g., the direction of line linking the center of an image sensor 533 of the second camera 530 to the center of the lens 531) toward the center of the FOV of the second camera 530 do not indicate the same subject or are not parallel to each other. FIG. 5 illustrates a state in which the direction 515 toward the center of the FOV of the first camera 510 and the direction 535 toward the center of the FOV of the second camera 530 are adjusted to be parallel to each other by moving the lens 531 of the second camera 530 in a direction 550.

The electronic device may move at least one of the lens 511 of the first camera 510 and the lens 531 of the second camera 530 such that the direction 515 toward the center of the FOV of the first camera 510 and the direction 535 toward the center of the FOV of the second camera 530 aim at a virtual subject, on the assumption that the virtual subject is spaced apart from the electronic device by a specific distance (e.g., about 1.2 m)

The parallax between the cameras may be measured during camera calibration in the manufacturing process of the camera assembly, and the information (e.g., the calibration value) on the parallax may be stored in the memory (e.g., the FROM) of the electronic device. The electronic device may correct the parallax based on the driving characteristic of each camera using the calibration value stored in the memory since the lens driving unit has a different driving characteristic in every camera module.

The electronic device may not correct the parallax between the cameras since the calibration value serves as an important factor in calculating the depth map when using a specific function (e.g., an out-of-focusing function) of the camera.

The electronic device may correct only the parallax occurring due to the assembly deviation of cameras, when the camera switching operation occurs while a preview image or a moving picture is being provided. In addition, the electronic device may additionally correct the parallax depending on the distance from a main subject.

When the camera switching operation occurs while the preview is being provided, the electronic device may prevent an image from being shifted on the preview by moving the lens of the camera which is not in charge of preview. In addition, in an auto-focus (AF) operation, the electronic device may prevent a user from recognizing the shift of the image by moving the direction toward the center of the FOV of the camera based on a distance to an object, which corresponds to a focus code.

Figure 6:
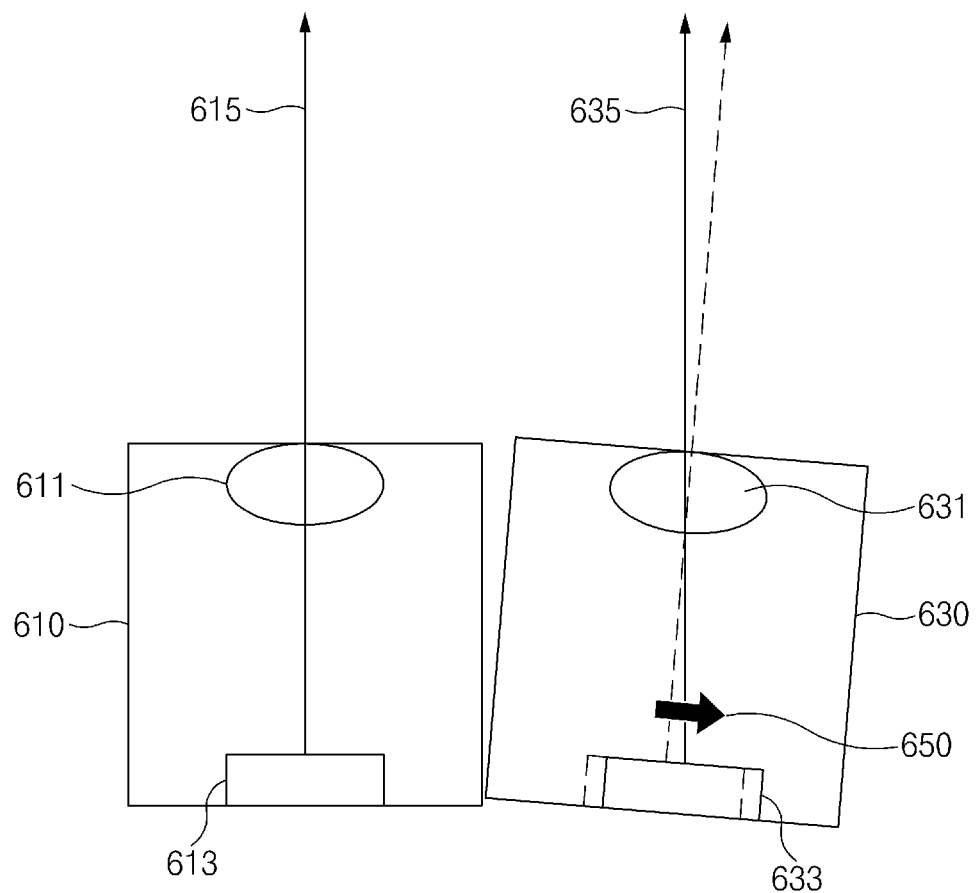
FIG. 6 is a diagram illustrating a method for reducing the parallax between a plurality of cameras by moving an image sensor, according to an embodiment.

FIG. 6 is a diagram illustrating a method for reducing the parallax between a plurality of cameras by moving an image sensor, according to an embodiment.

Referring to FIG. 6, an electronic device may move an image sensor of any one camera or a plurality of cameras to reduce the parallax between cameras.

According to an embodiment, the electronic device may move at least one of an image sensor 613 of a first camera 610 and an image sensor 633 of a second camera 630 when parallax exists between the first camera 610 and the second camera 630, that is, when a direction 615 (e.g., the direction of a line linking the center of the image sensor 613 of the first camera 610 and the center of a lens 611) toward the center of an FOV of the first camera 610 and a direction 635 (e.g., the direction of line linking the center of the image sensor 633 of the second camera 630 to the center of a lens 631) toward the center of the FOV of the second camera 630 do not indicate the same subject or are not parallel to each other. FIG. 6 illustrates a state in which the direction 615 toward the center of the FOV of the first camera 610 and the direction 635 toward the center of the FOV of the second camera 630 are adjusted to be parallel to each other by moving the image sensor 633 of the second camera 630 in a direction 650.

Figure 7:
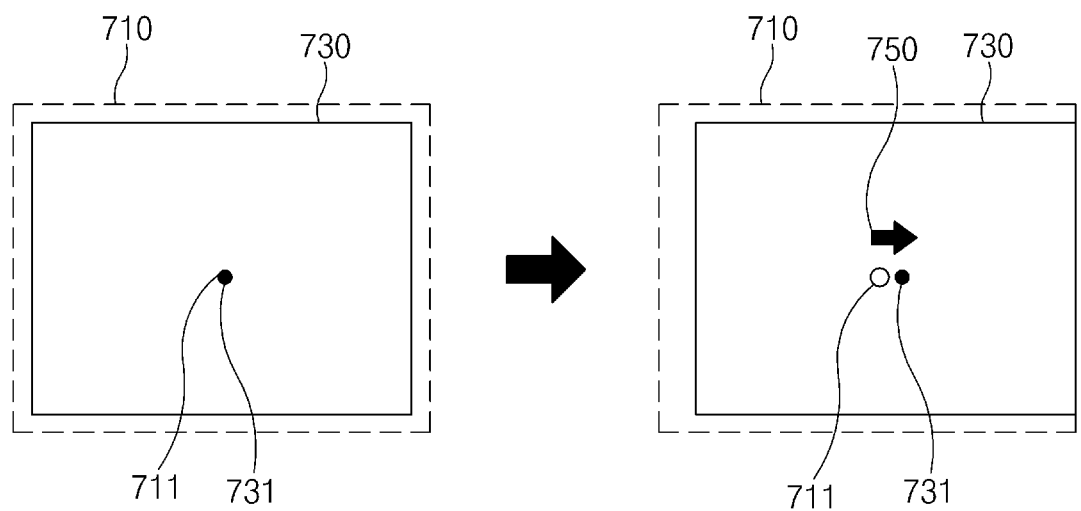
FIG. 7 is a diagram illustrating a method for compensating for the parallax between a plurality of cameras by moving the central point of a crop region in a crop procedure of an image sensor, according to an embodiment.

FIG. 7 is a diagram illustrating a method for compensating for the parallax between a plurality of cameras by moving the central point of a crop region in a crop procedure for an image sensor, according to an embodiment.

Referring to FIG. 7, an electronic device may move an image sensor of any one camera or a plurality of cameras to compensate for the parallax between cameras and may select (or extract) a portion of an image (or images) obtained from at least one image sensor. FIG. 7 illustrates a method in which an electronic device compensates for the parallax between cameras by shifting a central point 731 of a crop region 730 in a direction 750 from a central point 711 of an image sensor 710, in the procedure of cropping pixels 730 of a partial region in the image sensor 710 of the camera.

According to an embodiment, the electronic device may create an image captured through a camera by reading out one or more pixels selected from a plurality of pixels included in the image sensor 710, in an environment in which a plurality of cameras are used. Specifically, the image captured from the camera may be obtained based on a number of pixels that is smaller than a number of pixels of the image sensor 710, in the procedure of cropping the image sensor 710. The electronic device may shift the central point 731 of the crop region 730 of the image sensor 710 in the direction 750 of reducing the parallax between the cameras. For example, when the number of pixels of an image sensor in the first camera is different from the number of pixels of an image sensor in the second camera, the parallax may be reduced by using the image sensor having a larger number of pixels. When cropping an image sensor having a larger number of pixels to be matched with a smaller number of pixels, the electronic device may shift the central point 731 of the crop region 730 in the direction 750 to reduce the parallax.

The electronic device may perform the output of the image sensor after shifting the central point 731 of the crop region 730 of the image sensor 710. Alternatively, the electronic device may perform the output for the full pixels of the image sensor 710 and may shift the central point 731 of the crop region 730 during or after image signal processing (ISP) of the processor.

When reducing the parallax by shifting the central point 731 of the crop region 730 in the image sensor 710, the electronic device may identically shift central points of all crop regions of image sensors in a plurality of cameras.

The electronic device may perform all methods described above, that is, the combination of the methods of moving a lens of a camera, of moving an image sensor of a camera, and of cropping an image sensor by shifting the central point of the crop region.

The lens driving unit of the camera may operate in a driving scheme of a voice coil motor (VCM) including a magnetic substance and a coil. The electronic device may employ a displacement sensor such as, for example, a hall sensor, for feedback-control. The magnetic force of the magnetic substance and the position recognition rate of the displacement sensor may be varied depending on the temperature change made by the surrounding environment, and thus, the parallax between the cameras may be changed.

Accordingly, to minimize the change in the parallax between the cameras, the variation in temperature in each lens driving unit may need to be minimized. To this end, the electronic device may calculate, as numeric values, the variation in the magnetic force of the magnetic substance and the position recognition rate of the displacement sensor depending on the temperature, and may correct the magnetic force of the magnetic substance and the position recognition rate of the displacement sensor within an operation temperature range through additional temperature sensing, thereby minimizing the variation of the lens driving unit depending on the temperature. For example, when the temperature change of 80° C. (e.g., −20 to 60° C. is made, the driving angle of the lens driving unit may be changed by about 3 degrees. When the correction based on the temperature is performed, the variation of the driving angle may be reduced to 0.3 degrees.

The temperature correction factor of the lens driving unit may include the change of the magnetic force, the position recognition rate of the displacement sensor, and the mechanical change of the lens driving unit depending on the temperature. It is preferred that the temperature correction factor be obtained by experimentally varying the temperature. The temperature compensation factor experimentally obtained may be obtained differently by slightly changing the temperature range depending on the correction condition.

Figure 8:
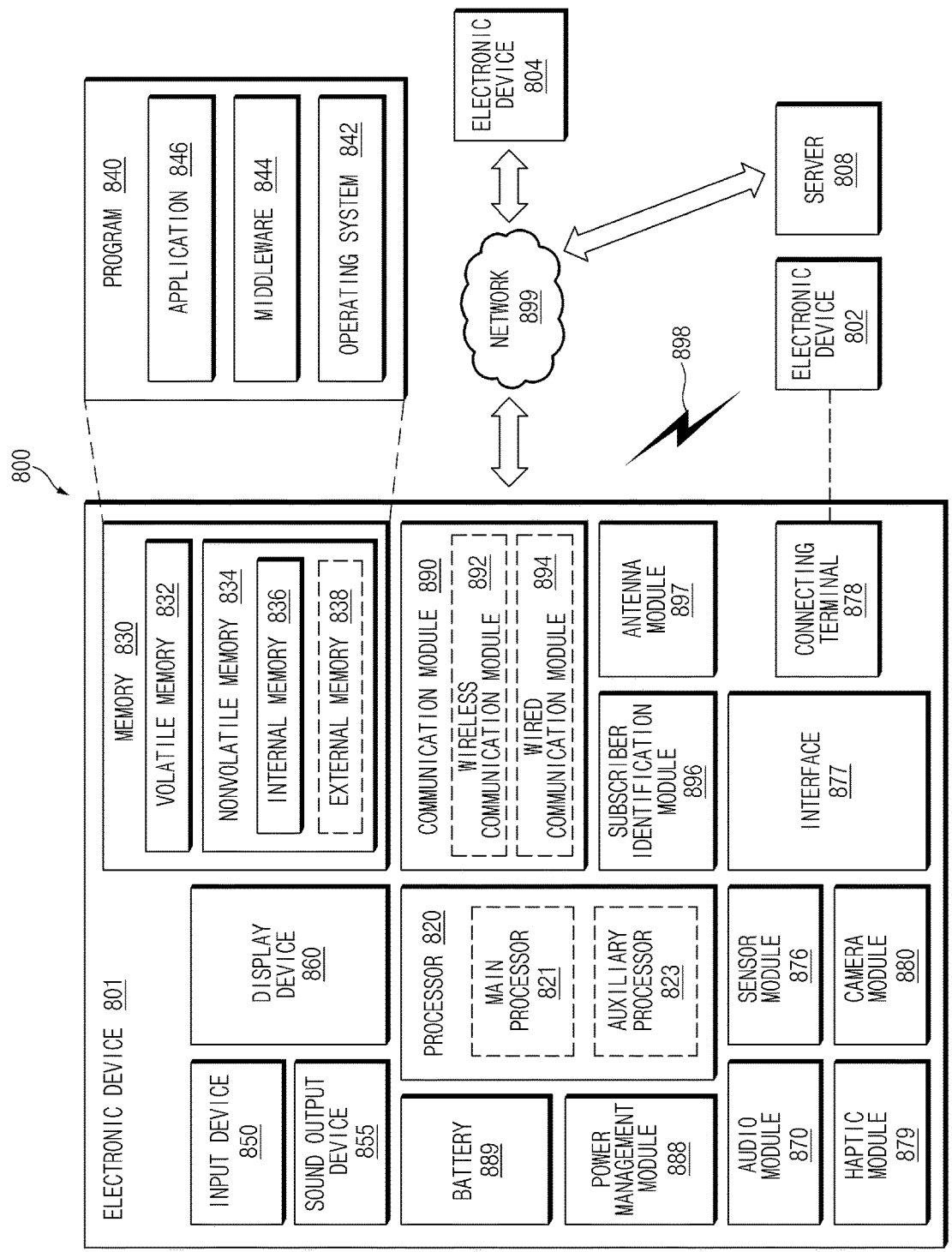
FIG. 8 is a block diagram illustrating an electronic device under a network environment, according to an embodiment.

FIG. 8 is a block diagram illustrating an electronic device in a network environment, according to an embodiment. An electronic device 801 may communicate with a first external electronic device 802 through a first network 898 (e.g., a short-range wireless communication) or may communicate with a second external electronic device 804 or a server 808 through a second network 899 (e.g., a long-distance wireless communication) in a network environment 800. The electronic device 801 may communicate with the second external electronic device 804 through the server 808. The electronic device 801 includes a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, and an antenna module 897. At least one component (e.g., the display device 860 or the camera module 880) of the electronic device 801 may be omitted or other components may be added to the electronic device 801. Some components may be integrated and implemented as in the case of the sensor module 876 (e.g., a fingerprint sensor, an iris sensor, or an illuminance sensor) embedded in the display device 860.

The processor 820 may operate, for example, software (e.g., a program 840) to control at least one of the other components (e.g., a hardware or software component) of the electronic device 801 connected to the processor 820, and may process and compute a variety of data. The processor 820 may load a command set or data, which is received from other components (e.g., the sensor module 876 or the communication module 890), into a volatile memory 832, may process the loaded command or data, and may store result data into a nonvolatile memory 834. According to an embodiment, the processor 820 may include a main processor 821 (e.g., a CPU or an AP) and an auxiliary processor 823 (e.g., a GPU, an ISP, a sensor hub processor, or a CP), which operates independently from the main processor 821, additionally or alternatively uses less power than the main processor 821, or is specified to a designated function. The auxiliary processor 823 may operate separately from the main processor 821 or may be embedded.

The auxiliary processor 823 may control, for example, at least some of functions or states associated with at least one component (e.g., the display device 860, the sensor module 876, or the communication module 890) among the components of the electronic device 801 instead of the main processor 821, while the main processor 821 is in an inactive (e.g., sleep) state or together with the main processor 821 while the main processor 821 is in an active (e.g., an application execution) state. The auxiliary processor 823 (e.g., the image signal processor or the communication processor) may be implemented as a part of another component (e.g., the camera module 880 or the communication module 890) that is functionally related to the auxiliary processor 823.

The memory 830 may store a variety of data used by at least one component (e.g., the processor 820 or the sensor module 876) of the electronic device 801, for example, software (e.g., the program 840) and input data or output data with respect to commands associated with the software. The memory 830 includes the volatile memory 832 or the nonvolatile memory 834.

The program 840 may be stored in the memory 830 as software and includes, for example, an operating system 842, middleware 844, and an application 846.

The input device 850 may be a device for receiving a command or data, which is used for a component (e.g., the processor 820) of the electronic device 801, from outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. The receiver and the speaker may be either integrally or separately implemented.

The display device 860 may be a device for visually presenting information to the user and may include, for example, a display, a hologram device, or a projector and a control circuit for controlling a corresponding device. The display device 860 may include touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through an external electronic device (e.g., the electronic device 802 (e.g., a speaker or a headphone)) wired or wirelessly connected to the sound output device 855 or the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected to the external electronic device 802. The interface 877 may include, for example, a high-definition multimedia interface (HDMI), a universal serial bus (USB) interface, an SD card interface, or an audio interface.

A connecting terminal 878 may include a connector that physically connects the electronic device 801 to the first external electronic device 802, for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric element, or an electric stimulator.

The camera module 880 may shoot a still image or a video image. The camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the electronic device 802, the electronic device 804, or the server 808) and support communication execution through the established communication channel. The communication module 890 may include at least one communication processor operating independently from the processor 820 (e.g., the AP) and supporting the wired communication or the wireless communication. The communication module 890 may include a wireless communication module 892 (e.g., a cellular communication module, a short-range wireless communication module, or a global navigation satellite system (GNSS) communication module) and/or a wired communication module 894 (e.g., a local area network (LAN) communication module or a power line communication module) and may communicate with the external electronic device using a corresponding communication module among them through the first network 898 (e.g., the short-range communication network such as a Bluetooth, a WiFi direct, or an Infrared Data Association (IrDA)) or the second network 899 (e.g., the long-distance wireless communication network such as a cellular network, an internet, or a computer network (e.g., LAN or wide area network (WAN))). The above-described communication modules 890 may be implemented into one chip or into separate chips, respectively.

The wireless communication module 892 may identify and authenticate the electronic device 801 using user information stored in the subscriber identification module 896 in the communication network.

The antenna module 897 may include one or more antennas to transmit or receive the signal or power to or from an external source. The communication module 890 (e.g., the wireless communication module 892) may transmit or receive the signal to or from the external electronic device through the antenna suitable for the communication method.

Some components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

The command or data may be transmitted or received between the electronic device 801 and the second external electronic device 804 through the server 808 connected to the second network 899. Each of the first and second external electronic devices 802 and 804 may be the same or different types as or from the electronic device 801. All or some of the operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

The electronic device may be various types of devices. The electronic device may include, for example, at least one of a portable communication device (e.g., a smartphone), a computer device, a portable multimedia device, a mobile medical appliance, a camera, a wearable device, or a home appliance. The electronic device is not limited to the above-described devices.

It should be understood that various embodiments and terms used in this disclosure do not intend to limit technologies disclosed in the present disclosure to the particular forms disclosed herein; rather, the present disclosure should be construed to cover various modifications, equivalents, and/or alternatives of embodiments. Regarding the description of drawings, similar components may be assigned with similar reference numerals. As used herein, singular forms may include plural forms as well unless the context clearly indicates otherwise. In the present disclosure, the expressions "A or B", "at least one of A and B", "A, B, or C" or "one or more of A, B, and C", and the like used herein may include any and all combinations of one or more of the associated listed items. The expressions "a first", "a second", "the first", or "the second", as used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module", as used herein, may represent, for example, a unit including one or more combinations of hardware, software and firmware. The term "module" may be interchangeably used with the terms "logic", "logical block", "part" and "circuit". A "module" may be a minimum unit of an integrated part or may be a part thereof. A "module" may be a minimum unit for performing one or more functions or a part thereof. For example, a "module" may include an application-specific integrated circuit (ASIC).

Various embodiments may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Herein, the term "non-transitory" is a limitation of the medium itself (i.e., tangible, not a signal) as opposed to a limitation on data storage persistency.

According to an embodiment, the method may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program), according to various embodiments, may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components, according to various embodiments, may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and detail may be made therein without departing from the spirit and scope as defined by the appended claims and their equivalents.

What is claimed is:

1. An electronic device comprising:
   a display;
   a first camera module comprising a first lens and a first lens driving device, which drives the first lens;
   a second camera module disposed adjacent to the first camera module and comprising an image sensor, a second lens and a second lens driving device, which drives the second lens; and
   a processor configured to:
   display a first image, which is obtained through the first camera module, through the display;
   receive an input associated with switching from the first camera module to the second camera module while the first image is being displayed through the display;
   move, based at least on the input, the image sensor or the second lens in a direction that reduces parallax with the first camera module using the second lens driving device; and
   display, based at least on the input, a second image, which is obtained through the second camera module in a state in which the image sensor or the second lens is moved, through the display.

2. The electronic device of claim 1, wherein the processor is further configured to:
   move, based at least on the input, the first lens in a direction that reduces parallax with the second camera module by using the first lens driving device.

3. The electronic device of claim 1, wherein the processor is further configured to:
   receive, as at least a portion of the input, a zoom input indicating a specified magnification or an input initiating a function for switching between the first camera module and the second camera module.

4. The electronic device of claim 1, wherein the first lens has a first field of view (FOV) and a first focus length, and wherein the second lens has a second FOV, which is narrower than the first FOV, and a second focus length, which is longer than the first focus length.

5. The electronic device of claim 4, wherein the direction is:
   a first direction that positions a direction of a central axis of the second FOV to be parallel with a direction of a central axis of the first FOV; or
   a second direction that positions the direction of the central axis of the second FOV to aim at a specific subject positioned in the direction of the central axis of the first FOV.

6. The electronic device of claim 1, wherein the processor is further configured to:
   select one or more pixels, which correspond to the direction that reduces the parallax with the first camera module, of a plurality of pixels included in the image sensor of the second camera module; and
   obtain the second image by using the selected one or more pixels.

7. The electronic device of claim 6, wherein the processor is further configured to:
   select one or more pixels, which correspond to a direction that reduces parallax with the second camera module, of a plurality of pixels included in an image sensor of the first camera module; and
   obtain the first image by using the selected one or more pixels.

8. The electronic device of claim 1, wherein the processor is further configured to:
   select, as the second image, at least a portion of an image, which corresponds to the direct ion that reduces the parallax with the first camera module, the image being obtained through the second camera module.

9. The electronic device of claim 8, wherein the processor is further configured to:
   select, as the first image, at least a portion of an image, which correspond to a direction that reduces parallax with the second camera module, the image being obtained through the first camera module.

10. The electronic device of claim 2, further comprising a sensor, wherein the processor is further configured to:
    determine a degree of movement for the first lens or a degree of movement for the second lens, based on a temperature measured through the sensor or a variation of the temperature.

11. An electronic device comprising:
    a display;
    a first camera module comprising a first lens and a first lens driving device, which drives the first lens;
    a second camera module comprising an image sensor, a second lens and a second lens driving device, which drives the second lens; and
    a processor configured to:
    receive an input associated with the first camera module or the second camera module;
    move the image sensor without moving the second lens or move the second lens without moving the image sensor in a direction that reduces parallax with the first camera module by using the second lens driving device, in response to the input;

obtain an image through the second camera module in a state in which the image sensor or the second lens is moved; and display the image through the display.

12. The electronic device of claim 11, wherein the processor is further configured to:

move the first lens in a direction that reduces parallax with the second camera module by using the first lens driving device, in response to the input.

13. The electronic device of claim 11, wherein the processor is further configured to:

receive, as at least a portion of the input, an input for initiating a function for switching between the first camera module and the second camera module.

14. The electronic device of claim 11, wherein the processor is further configured to:

select one or more pixels, which correspond to the direction that reduces the parallax with the first camera module, of a plurality of pixels included in the image sensor of the second camera module; and obtain the image by using the selected one or more pixels.

15. An electronic device comprising:

a display;

a first camera module comprising a first lens;

a second camera module disposed adjacent to the first camera module and comprising an image sensor, a second lens and a lens driving device, which drives the second lens; and a processor configured to:

display a first image, which is obtained through the first camera module through the display;

receive an input associated with switching from the first camera module to the second camera module while the first image is being displayed through the display;

move, based at least on the input, the image sensor or the second lens in a direction that reduces parallax with the first camera module by using the lens driving device; and display, based at least on the input, a second image, which is obtained through the second camera module in a state in which the image sensor or the second lens is moved, through the display.

16. The electronic device of claim 15, wherein the processor is configured to:

select one or more pixels, which correspond to the direction of reducing the parallax with the first camera module, of a plurality of pixels included in the image sensor of the second carver a module; and obtain the second image by using the selected one or more pixels.

17. The electronic device of claim 16, wherein the processor is further configured to:

select one or more pixels, which correspond to a direction that reduces parallax with the second camera module, of a plurality of pixels included in an image sensor of the first camera module; and obtain the first image by using the selected one or more pixels.

18. The electronic device of claim 15, wherein the processor is further configured to:

select, as the second image, at least a portion, which corresponds to the direction that reduces the parallax with the first camera module, of an image obtained through the second camera module.

19. The electronic device of claim 18, wherein the processor is further configured to:

select, as the first image, at least a portion of an image, which correspond to a direction that reduces parallax with the second camera module, the image being obtained through the first camera module.

20. The electronic device of claim 15, further comprising a sensor, wherein the processor is further configured to:

determine a degree of movement for the second lens, based on a temperature measured through the sensor or a variation of the temperature.

* * * * *